(12) United States Patent  
Hara

(10) Patent No.: US 12,304,303 B2
(45) Date of Patent: May 20, 2025

(54) POWER TRANSMISSION DEVICE

(71) Applicant: UNIVANCE CORPORATION, Kosai (JP)

(72) Inventor: Tomoyuki Hara, Kosai (JP)

(73) Assignee: UNIVANCE CORPORATION, Kosai (JP)

( * ) Notice: Subject to any disclaimer, the term of this patent is extended or adjusted under 35 U.S.C. 154(b) by 0 days.

(21) Appl. No.: 18/266,952

(22) PCT Filed: Jun. 10, 2021

(86) PCT No.: PCT/JP2021/022055
§ 371 (c)(1),
(2) Date: Jun. 13, 2023

(87) PCT Pub. No.: WO2022/259449
PCT Pub. Date: Dec. 15, 2022

(65) Prior Publication Data
US 2023/0364989 A1 Nov. 16, 2023

(51) Int. Cl.
B60K 17/08 (2006.01)
(52) U.S. Cl.
CPC .................................. B60K 17/08 (2013.01)
(58) Field of Classification Search
CPC ...................................... B60K 17/08
USPC ..................................... 74/661, 333
See application file for complete search history.

(56) References Cited

U.S. PATENT DOCUMENTS

| 5,899,286 A * | 5/1999 | Yamaguchi ........... B60W 20/10 903/910 |
| 11,162,562 B2* | 11/2021 | Yu ............................ B60K 5/08 |
| 11,440,513 B2* | 9/2022 | Plow ........................ B62D 63/04 |
| 2009/0038866 A1* | 2/2009 | Abe .......................... F16H 48/36 180/65.7 |
| 2014/0371016 A1 | 12/2014 | Knoblauch |
| 2015/0072819 A1 | 3/2015 | Ono et al. |

(Continued)

FOREIGN PATENT DOCUMENTS

| CN | 207360088 U | 5/2018 |
| CN | 110217087 A | 9/2019 |
| CN | 110366501 A | 10/2019 |

(Continued)

OTHER PUBLICATIONS

International Search Report dated Jul. 13, 2021, issued in counterpart International Application No. PCT/JP2021/022055, with English Translation. (6 pages).

(Continued)

Primary Examiner — Ha Dinh Ho
(74) Attorney, Agent, or Firm — WHDA, LLP

(57) ABSTRACT

The power transmission device comprises a first shaft and second shaft to which the power of two motors is respectively inputted, an output shaft disposed on a different axis than the first shaft, a first reduction mechanism that transmits the rotation of the first shaft to the output shaft through a plurality of paths, and a second reduction mechanism that transmits the rotation of the second shaft to the output shaft through one path. In the first reduction mechanism, the plurality of paths have different gear ratios, and the gear ratio of the second reduction mechanism is the smallest or largest among all the gear ratios of the reduction mechanisms.

3 Claims, 4 Drawing Sheets

(56) References Cited

U.S. PATENT DOCUMENTS

2019/0366822 A1* 12/2019 Yu .............................. B60K 1/02
2020/0003279 A1*  1/2020 Hara ........................ B60K 17/02

FOREIGN PATENT DOCUMENTS

| | | |
|---|---|---|
| CN | 110566640 A | 12/2019 |
| CN | 110605963 A | 12/2019 |
| CN | 111251906 B | 5/2021 |
| CN | 116923088 A | 10/2023 |
| DE | 102015206190 A1 | 10/2016 |
| FR | 3075704 A3 | 6/2019 |
| JP | 2010-76679 A | 4/2010 |
| JP | 2011-33077 A | 2/2011 |
| JP | 2015-508353 A | 3/2015 |
| JP | 2015-85765 A | 5/2015 |
| JP | 2019-56467 A | 4/2019 |
| WO | 2013/114595 A1 | 8/2013 |

OTHER PUBLICATIONS

Written Opinion of the International Searching Authority (Form PCT/ISA/237) dated Jul. 13, 2021, issued in counterpart International Application No. PCT/JP2021/022055. (3 pages).
Office Action dated Dec. 12, 2023, issued in counterpart JP Application No. 2023-526744, with English translation. (5 pages).
Office Action dated Mar. 19, 2024, issued in counterpart JP Application No. 2023-526744, with English translation. (6 pages).
English Translation of Written Opinion dated Jul. 13, 2021, issued in counterpart Application No. PCT/JP2021/022055. (3 pages).
Extended Supplementary European Search Report dated Jul. 16, 2024, issued in counterpart Application No. 21945125.9. (17 pages).

\* cited by examiner

POWER TRANSMISSION DEVICE

TECHNICAL FIELD

The present invention relates to a power transmission device, and particularly to a power transmission device that transmits powers of two motors to an output shaft.

BACKGROUND ART

A power transmission device including a first shaft and a second shaft to which the powers of two motors are respectively inputted, and a reduction mechanism configured to transmit the rotation of the first shaft and the rotation of the second shaft to an output shaft, has been known (Patent Document 1). According to the conventional technique disclosed in Patent Document 1, a first gear train and a third gear train disposed between the first shaft and the output shaft transmit the rotation from the first shaft to the output shaft, and a second gear train disposed between the second shaft and the output shaft transmits the rotation from the second shaft to the output shaft. In the conventional technique, gear shift can be performed by switching clutch engagement, from/to a first gear in which the first gear train transmits the rotation from the first shaft to the output shaft, a second gear in which the second gear train transmits the rotation from the second shaft to the output shaft, and a third gear in which the third gear train transmits the rotation from the first shaft to the output shaft. In the conventional technique, when the clutch engagement is switched, the powers of the motors continue to be transmitted to the output shaft through the second gear train, thereby reducing torque reduction (so-called torque release) in the output shaft during a shifting operation.

PRIOR ART DOCUMENT

Patent Document

Patent Document 1: Japanese Patent Application Laid-Open (kokai) No. 2019-56467

SUMMARY OF THE INVENTION

Problem to be Solved by the Invention

In the conventional technique, the torque of the output shaft is supplemented through the second gear train during the shifting operation. Thus, when the rotation speed of the output shaft is high at the time of shift-up from the second gear to the third gear, the rotation speed of a motor may not sometimes reach that of the second gear train even if the motor is operated until reaching a maximum rotation speed of the motor, although it depends on the gear ratio of the third gear train. If the rotation speed of the motor does not reach that of the second gear train, the torque of the output shaft cannot be supplemented. In addition, the first gear train is disposed on the same axis as the third gear train in the conventional technique. Thus, the torque of the output shaft cannot be supplemented through the first gear train having the largest gear ratio when a large torque is required.

The present invention is made to solve the above problem, and an object of the present invention is to provide a power transmission device capable of supplementing the torque of an output shaft during a desired shifting operation.

Means for Solving the Problem

In order to achieve the object, a power transmission device according to the present invention includes: a first shaft and a second shaft to which powers of two motors are respectively inputted; an output shaft disposed on an axis different from that of the first shaft; a first reduction mechanism configured to transmit rotation of the first shaft to the output shaft through a plurality of paths; and a second reduction mechanism configured to transmit rotation of the second shaft to the output shaft through one path. In the first reduction mechanism, the plurality of paths have different gear ratios. A gear ratio of the second reduction mechanism is smallest or largest among all gear ratios of the reduction mechanisms.

Advantageous Effects of the Invention

According to a first aspect, powers of two motors are respectively inputted to a first shaft and a second shaft. A first reduction mechanism is configured to transmit rotation of the first shaft to an output shaft disposed on an axis different from that of the first shaft through a plurality of paths. In the first reduction mechanism, the plurality of paths have different gear ratios. A second reduction mechanism is configured to transmit rotation of the second shaft to the output shaft through one path. A gear ratio of the second reduction mechanism is smallest or largest among all gear ratios of the reduction mechanisms. Accordingly, the second reduction mechanism can supplement torque of the output shaft during a desired shifting operation.

A second aspect according to the first aspect includes a first clutch that transmits or interrupts torque between: a shaft that is other than the first shaft and is included in the first reduction mechanism; and a shaft that is disposed on the same axis as the shaft and is included in the second reduction mechanism. The first clutch can connect or disconnect paths for transmitting the power between the two motors.

In a third aspect according to the first or second aspect, the first shaft and the second shaft are disposed on the same axis, and a second clutch that transmits or interrupts torque between the first shaft and the second shaft is provided. The second clutch is engaged to transmit the total power of the two motors to the output shaft.

MODES FOR CARRYING OUT THE INVENTION

Figure 1:
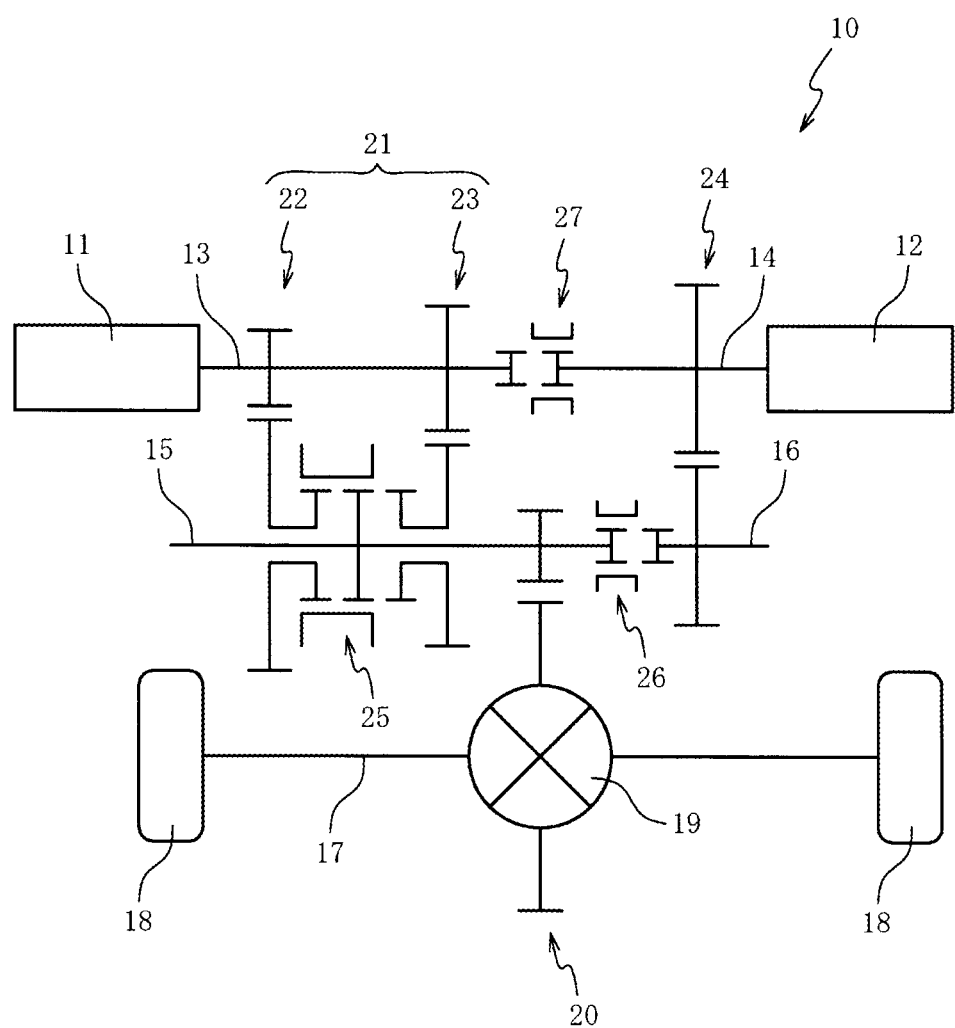
FIG. 1 Skeleton diagram of a power transmission device according to the first embodiment.

Hereinafter, preferred embodiments of the present invention will be described with reference to the accompanying drawings. With reference to FIG. 1, a power transmission device 10 according to the first embodiment will be described. FIG. 1 is a skeleton diagram of the power transmission device 10 of the first embodiment. The power transmission device 10 is mounted in a vehicle (the same applies in FIG. 2 to FIG. 4).

The power transmission device 10 includes: a first shaft 13 to which the power of a first motor 11 is inputted; a second shaft 14 to which the power of a second motor 12 is inputted; an output shaft 15 disposed on an axis different from that of the first shaft 13; a first reduction mechanism 21 configured to transmit the rotation of the first shaft 13 to the output shaft 15; and a second reduction mechanism 24 configured to transmit the rotation of the second shaft 14 to the output shaft 15 through a third shaft 16.

The first motor 11 and the second motor 12 are each an electric motor that functions as a generator, for example. The first motor 11 is a motor for low speed with a larger torque at low speed than the second motor 12. The second motor 12 is a motor for high speed with a higher rated rotation speed than the first motor 11. As a matter of course, the first motor 11 and the second motor 12 can be electric motors having the same specification.

A rotation shaft of the first motor 11 and the first shaft 13 can be integrally formed, or a transmission member such as a gear pair or a chain can be interposed between the rotation shaft of the first motor 11 and the first shaft 13. Similarly, a rotation shaft of the second motor 12 and the second shaft 14 can be integrally formed, or a transmission member such as a gear pair or a chain can be interposed between the rotation shaft of the second motor 12 and the second shaft 14. The first shaft 13 and the second shaft 14 are disposed on the same axis. The output shaft 15 is arranged in parallel to the first shaft 13. The third shaft 16 is disposed on the same axis as the output shaft 15.

An axle 17 is disposed on an axis different from that of the output shaft 15 of the power transmission device 10. Wheels 18 are respectively disposed at both ends of the axle 17. A differential 19 is disposed at the center of the axle 17. An output gear train 20 disposed between the output shaft 15 and the differential 19 transmits the rotation of the output shaft 15 to the differential 19. The differential 19 performs distribution of the torque of the output shaft 15 to the axle 17.

The first reduction mechanism 21 includes a first gear train 22 and a second gear train 23. The second reduction mechanism 24 configures a third gear train. The first gear train 22 and the second gear train 23 are disposed between the first shaft 13 and the output shaft 15. The second reduction mechanism 24 is disposed between the second shaft 14 and the third shaft 16. A gear ratio becomes smaller in the order of the first gear train 22, the second gear train 23, and the second reduction mechanism 24 (third gear train).

A switching device 25 is disposed on the output shaft 15. The switching device 25 selects a path (the first gear train 22 or the second gear train 23) through which the rotation of the first shaft 13 is transmitted to the output shaft 15. An actuator (not shown) is actuated to cause the switching device 25 to switch the path. Examples of the switching device 25 include a clutch and a brake. Examples of the clutch include a machine clutch and an electromagnetic clutch. Examples of the machine clutch include a meshing clutch, such as a tooth clutch or a dog clutch, and a friction clutch, such as a disc clutch or a cone clutch. Examples of the brake include a machine brake and an electromagnetic brake.

The first clutch 26 transmits or interrupts torque between the output shaft 15 and the third shaft 16. Examples of the first clutch 26 include a meshing clutch, such as a tooth clutch or a dog clutch, a friction clutch, such as a disc clutch or a cone clutch, and a one-way clutch. In the case where the first clutch 26 is a meshing clutch, a friction clutch, or the like, an actuator (not shown) is actuated to engage or disengage the clutch.

In the case where the first clutch 26 is a one-way clutch, when a rotation speed of the third shaft 16 is higher than that of the output shaft 15, the first clutch 26 transmits the torque of the third shaft 16 to the output shaft 15. When a rotation speed of the output shaft 15 is lower than that of the third shaft 16, the first clutch 26 interrupts transmission of the torque between the output shaft 15 and the third shaft 16. In the case where the first clutch 26 is a one-way clutch, the relative rotation between the output shaft 15 and the third shaft 16 allows a clutch operation to be switched without an actuator for engaging or disengaging a clutch.

The second clutch 27 transmits or interrupts torque between the first shaft 13 and the second shaft 14. Examples of the second clutch 27 include a meshing clutch, such as a tooth clutch or a dog clutch, and a friction clutch, such as a disc clutch or a cone clutch. An actuator (not shown) is actuated to engage or disengage the second clutch 27.

A shifting operation of the power transmission device 10 will be described. In a first gear, the first motor 11 operates and the second motor 12 stops. The second clutch 27 is disengaged. The switching device 25 is actuated to transmit the rotation from the first shaft 13 to the output shaft 15 through the first gear train 22. When the first clutch 26 is engaged, the second motor 12 is caused to rotate by the rotation of the output shaft 15, thereby allowing the regenerative energy of the second motor 12 to be utilized. When the first clutch 26 is disengaged, the second motor 12 is not caused to rotate in conjunction with rotation of another member. Thus, the second motor 12 can be protected, and overcharge of a battery (not shown) due to the regenerative energy of the second motor 12 can be prevented.

In a shifting operation from the first gear to a second gear, the second motor 12 operates and the first clutch 26 is engaged, while the state of the first gear is maintained. The torque of the second shaft 14 generated by the output of the second motor 12 is transmitted to the third shaft 16 through the second reduction mechanism 24. When the first clutch 26 is engaged, the torque is transmitted from the third shaft 16 to the output shaft 15, while the switching device 25 is actuated and a rotation transmission path is switched from the first gear train 22 to the second gear train 23. Thus, the torque of the output shaft 15 can be supplemented during the shifting operation.

In the first gear, the first clutch 26 may be disengaged, the second clutch 27 may be engaged, and the second motor 12 may be operated together with the first motor 11. Accordingly, the total power of the first motor 11 and the second motor 12 can be transmitted to the output shaft 15 through the first gear train 22.

In the second gear, the first motor 11 operates and the second motor 12 stops. The second clutch 27 is disengaged. The switching device 25 is actuated to transmit the rotation from the first shaft 13 to the output shaft 15 through the second gear train 23. When the first clutch 26 is disengaged, the second motor 12 is not caused to rotate in conjunction with rotation of another member. When the first clutch 26 is engaged, the regenerative energy of the second motor 12 can be utilized.

In a shifting operation from the second gear to a third gear, the second motor 12 operates and the first clutch 26 is engaged, while the state of the second gear is maintained. The torque of the second shaft 14 generated by the output of the second motor 12 is transmitted to the third shaft 16 through the second reduction mechanism 24. When the first clutch 26 is engaged, the torque is transmitted from the third shaft 16 to the output shaft 15, even when the switching device 25 is actuated to cause the second gear train 23 to slip. Thus, the torque of the output shaft 15 can be supplemented during the shifting operation.

In the second gear, the first clutch 26 may be disengaged, the second clutch 27 may be engaged, and the second motor 12 may be operated together with the first motor 11. Accordingly, the total power of the first motor 11 and the second motor 12 can be transmitted to the output shaft 15 through the second gear train 23.

In the third gear, the first motor 11 stops and the second motor 12 operates. The first clutch 26 is engaged and the second clutch 27 is disengaged. The switching device 25 is actuated to cause the first gear train 22 and the second gear train 23 to slip. The torque of the second shaft 14 generated by the output of the second motor 12 is transmitted to the third shaft 16, the second clutch 27, and the output shaft 15 through the second reduction mechanism 24. It should be noted that the first motor 11 may be operated.

In the third gear, the first clutch 26 and the second clutch 27 may be each engaged, and the second motor 12 may be operated together with the first motor 11. Accordingly, the total power of the first motor 11 and the second motor 12 can be transmitted to the output shaft 15 through the second reduction mechanism 24.

In the power transmission device 10, the second reduction mechanism 24 is configured to transmit the rotation of the second shaft 14 to the output shaft 15 through one path. The gear ratio of the second reduction mechanism 24 is the smallest among all the gear ratios of the reduction mechanisms 21, 24. In the shifting operation from the first gear to the second gear and in the shifting operation from the second gear to the third gear, the torque of the second motor 12 can be transmitted to the output shaft 15 through the second reduction mechanism 24, and thus the torque of the output shaft 15 can be supplemented during the shifting operation. Particularly, the present invention is suitable for supplementing torque during a shifting operation in high speed running. Furthermore, efficient regions of the motors 11, 12 can be utilized according to a running condition of a vehicle. Therefore, power consumption can be reduced, and the running performance of the vehicle can be improved.

If the first motor 11 has failed, the first clutch 26 is engaged, the second clutch 27 is disengaged, and the switching device 25 is actuated to cause the first gear train 22 and the second gear train 23 to slip. Accordingly, the second motor 12 can be operated to drive the output shaft 15. If the second motor 12 has failed, the first clutch 26 and the second clutch 27 are each disengaged. Accordingly, the first motor 11 can be operated to drive the output shaft 15.

Figure 2:
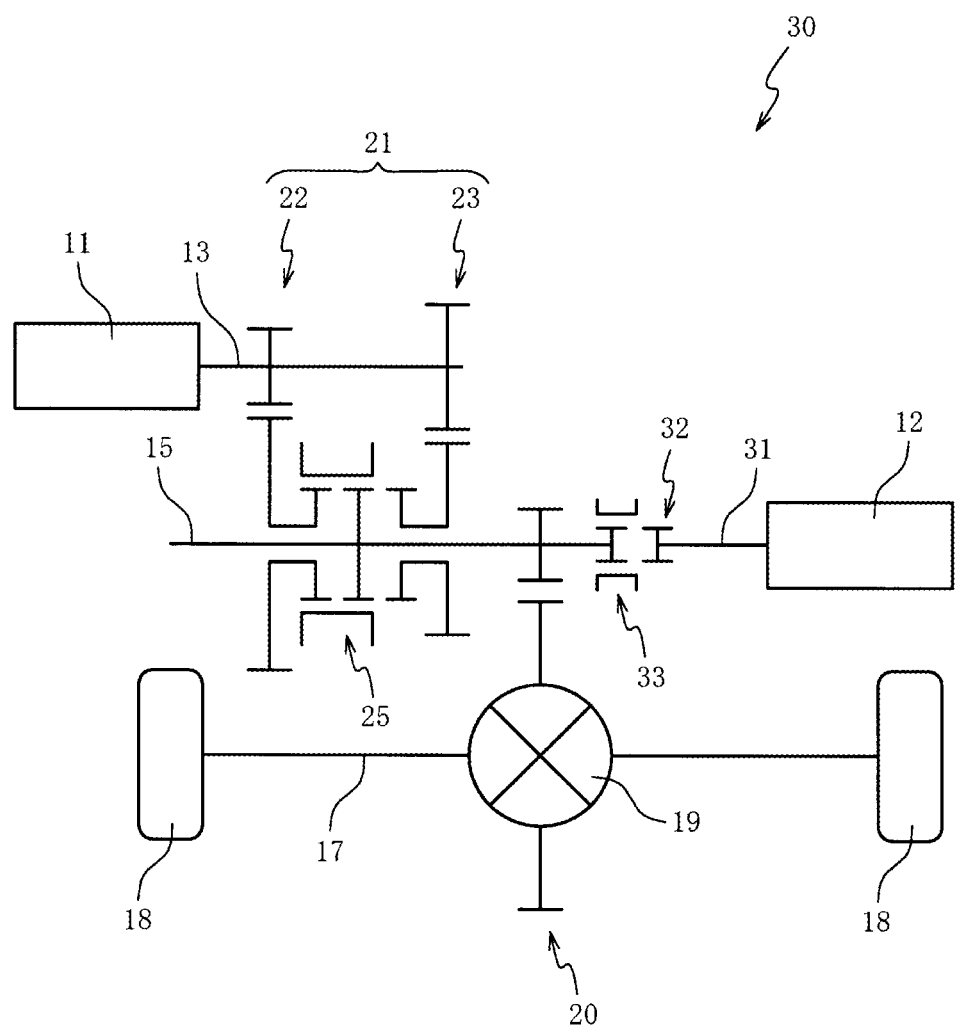
FIG. 2 Skeleton diagram of a power transmission device according to the second embodiment.

With reference to FIG. 2, a power transmission device 30 of the second embodiment will be described. In the first embodiment, the case where the first shaft 13 and the second shaft 14 are disposed on the same axis has been described. On the other hand, in the second embodiment, the case where a first shaft 13 and a second shaft 31 are respectively disposed on different axes will be described. The same components as described in the first embodiment are designated by the same reference characters, and the description thereof is omitted. FIG. 2 is a skeleton diagram of the power transmission device 30 according to the second embodiment.

The power transmission device 30 includes the first shaft 13, the second shaft 31 to which the power of a second motor 12 is inputted, an output shaft 15, a first reduction mechanism 21, and a second reduction mechanism 32 configured to transmit the rotation of the second shaft 31 to the output shaft 15. A rotation shaft of the second motor 12 and the second shaft 31 can be integrally formed, or a transmission member such as a gear pair or a chain can be interposed between the rotation shaft of the second motor 12 and the second shaft 31. The output shaft 15 and the second shaft 31 are disposed on the same axis.

The second reduction mechanism 32 configures a third gear train. The second reduction mechanism 32 is configured to transmit the rotation of the second shaft 31 to the output shaft 15 as it is. A gear ratio becomes smaller in the order of a first gear train 22, a second gear train 23, and the second reduction mechanism 32 (third gear train).

A first clutch 33 transmits or interrupts torque between the output shaft 15 and the second shaft 31. Examples of the first clutch 33 include a meshing clutch, such as a tooth clutch or a dog clutch, a friction clutch, such as a disc clutch or a cone clutch, and a one-way clutch.

A shifting operation of the power transmission device 30 is the same as the shifting operation of the power transmission device 10 of the first embodiment except for a part to which the second clutch 27 is related, and thus the description thereof is omitted.

Figure 3:
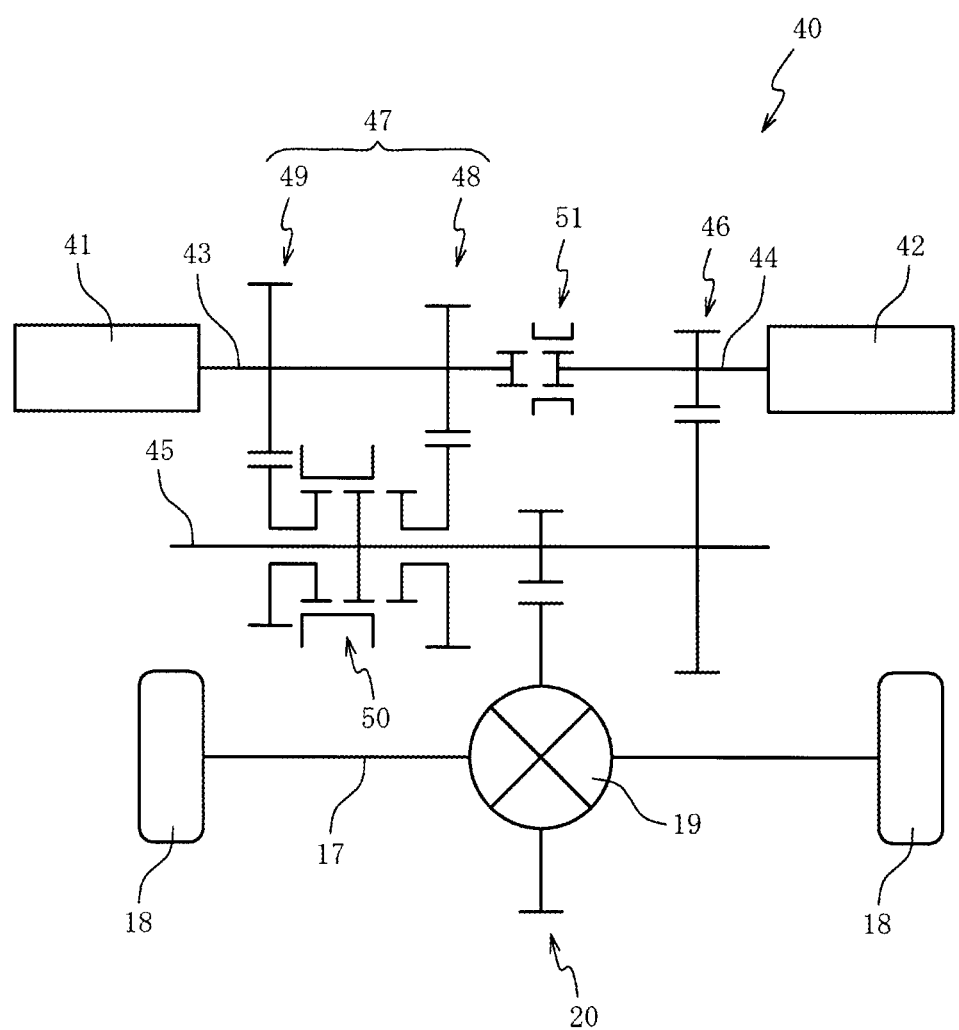
FIG. 3 Skeleton diagram of a power transmission device according to the third embodiment.

With reference to FIG. 3, a power transmission device 40 of the third embodiment will be described. In the first embodiment and the second embodiment, the gear ratio of the second reduction mechanism 24, 32 is the smallest among all the gear ratios of the reduction mechanisms. On the other hand, in the third embodiment, the case where the gear ratio of a second reduction mechanism 46 is the largest among all the gear ratios of the reduction mechanisms will be described. The same components as described in the first embodiment are designated by the same reference characters, and the description thereof is omitted. FIG. 3 is a skeleton diagram of the power transmission device 40 according to the third embodiment.

The power transmission device 40 includes a first shaft 43 to which the power of a first motor 41 is inputted, a second shaft 44 to which the power of a second motor 42 is inputted, an output shaft 45 disposed on an axis different from that of the first shaft 43, a first reduction mechanism 47 configured to transmit the rotation of the first shaft 43 to the output shaft 45, and the second reduction mechanism 46 configured to transmit the rotation of the second shaft 44 to the output shaft 45. The power transmission device 40 is preferably mounted in construction machinery, agricultural machinery, or the like, which requires a large high-speed torque, among vehicles.

The first motor 41 and the second motor 42 are, for example, electric motors that also function as generators. The first motor 41 is a motor for high speed with a higher rated rotation speed than the second motor 42. The second motor 42 is a motor for low speed with a larger torque at low speed than the first motor 41. As a matter of course, the first motor 41 and the second motor 42 can be electric motors having the same specification.

A rotation shaft of the first motor 41 and the first shaft 43 can be integrally formed, or a transmission member such as a gear pair or a chain can be interposed between the rotation shaft of the first motor 41 and the first shaft 43. Similarly, a rotation shaft of the second motor 42 and the second shaft 44 can be integrally formed, or a transmission member such as a gear pair or a chain can be interposed between the rotation shaft of the second motor 42 and the second shaft 44. The first shaft 43 and the second shaft 44 are disposed on the same axis. The output shaft 45 is disposed in parallel to the first shaft 43.

The first reduction mechanism 47 includes a second gear train 48 and a third gear train 49. The second reduction mechanism 46 configures a first gear train. The second gear train 48 and the third gear train 49 are disposed between the first shaft 43 and the output shaft 45. The second reduction mechanism 46 is disposed between the second shaft 44 and the output shaft 45. A gear ratio becomes larger in the order of the third gear train 49, the second gear train 48, and the second reduction mechanism 46 (first gear train).

A maximum rotation speed of the second motor 42 is preferably not lower than a value obtained by multiplying a value, which has been obtained by dividing the gear ratio of the second reduction mechanism 46 (first gear train) by the gear ratio of the third gear train 49, by a maximum rotation speed of the first motor 41, in order to cause the second motor 42 to supplement the torque of the output shaft 45.

A switching device 50 is disposed on the output shaft 45. The switching device 50 selects a path (the second gear train 48 or the third gear train 49) through which the rotation of the first shaft 43 is transmitted to the output shaft 45. An actuator (not shown) is actuated to cause the switching device 50 to switch the path. Examples of the switching device 50 include a clutch and a brake.

A second clutch 51 transmits or interrupts torque between the first shaft 43 and the second shaft 44. Examples of the second clutch 51 include a meshing clutch, such as a tooth clutch or a dog clutch, and a friction clutch, such as a disc clutch or a cone clutch.

A shifting operation of the power transmission device 40 will be described. In a first gear, the first motor 41 stops and the second motor 42 operates. The second clutch 51 is disengaged. The switching device 50 is actuated to cause the second gear train 48 and the third gear train 49 to slip. The torque of the second shaft 44 generated by the output of the second motor 42 is transmitted to the output shaft 45 through the second reduction mechanism 46. It should be noted that the first motor 41 may be operated.

In a shifting operation from the first gear to a second gear, the first motor 41 operates and the switching device 50 is actuated to transmit the torque of the first shaft 43 to the output shaft 45 through the second gear train 48, while the state of the first gear is maintained. Until the torque of the first shaft 43 is transmitted to the output shaft 45 through the second gear train 48 that has been slipping in the first gear, the torque of the second shaft 44 is transmitted to the output shaft 45 through the second reduction mechanism 46. Thus, the torque of the output shaft 45 can be supplemented during the shifting operation.

In the first gear, the second clutch 51 may be engaged, and the second motor 42 may be operated together with the first motor 41. Accordingly, the total power of the first motor 41 and the second motor 42 can be transmitted to the output shaft 45 through the second reduction mechanism 24.

In the second gear, the first motor 41 operates and the second motor 42 stops. The switching device 50 is actuated to transmit the rotation from the first shaft 43 to the output shaft 45 through the second gear train 48. The rotation of the output shaft 45 is transmitted to the second motor 42 through the second reduction mechanism 46. Thus, the regenerative energy of the second motor 42 can be utilized.

In a shifting operation from the second gear to a third gear, the second motor 42 operates, while the state of the second gear is maintained. While the switching device 50 is actuated to switch the rotation transmission path from the second gear train 48 to the third gear train 49, the torque of the second shaft 44 generated by the output of the second motor 42 is transmitted to the output shaft 45 through the second reduction mechanism 46. Thus, the torque of the output shaft 15 can be supplemented during the shifting operation.

In the third gear, the first motor 41 operates and the second motor 42 stops. The rotation is transmitted from the first shaft 43 to the output shaft 45 through the third gear train 49. The rotation of the output shaft 45 is transmitted to the second motor 42 through the second reduction mechanism 46. Thus, the regenerative energy of the second motor 42 can be utilized.

In the power transmission device 40, the second reduction mechanism 46 is configured to transmit the rotation of the second shaft 44 to the output shaft 45 through one path. The gear ratio of the second reduction mechanism 46 is the largest among all the gear ratios of the reduction mechanisms 46, 47. In the shifting operation from the first gear to the second gear and in the shifting operation from the second gear to the third gear, the torque of the second motor 42 can be transmitted to the output shaft 45 through the second reduction mechanism 46, and thus the torque of the output shaft 45 can be supplemented during the shifting operation. Particularly, the present invention is suitable for supplementing torque during a shifting operation in low speed running. Furthermore, efficient regions of the motors 41, 42 can be utilized according to a running condition of a vehicle. Therefore, power consumption can be reduced, and the running performance of the vehicle can be improved.

Since the efficient regions of the motors 41, 42 can be utilized in the power transmission device 40 according to the running condition of the vehicle, power consumption can be reduced and the running performance of the vehicle can be improved. Particularly, torque release can be reduced during the shifting operation in low speed running.

Figure 4:
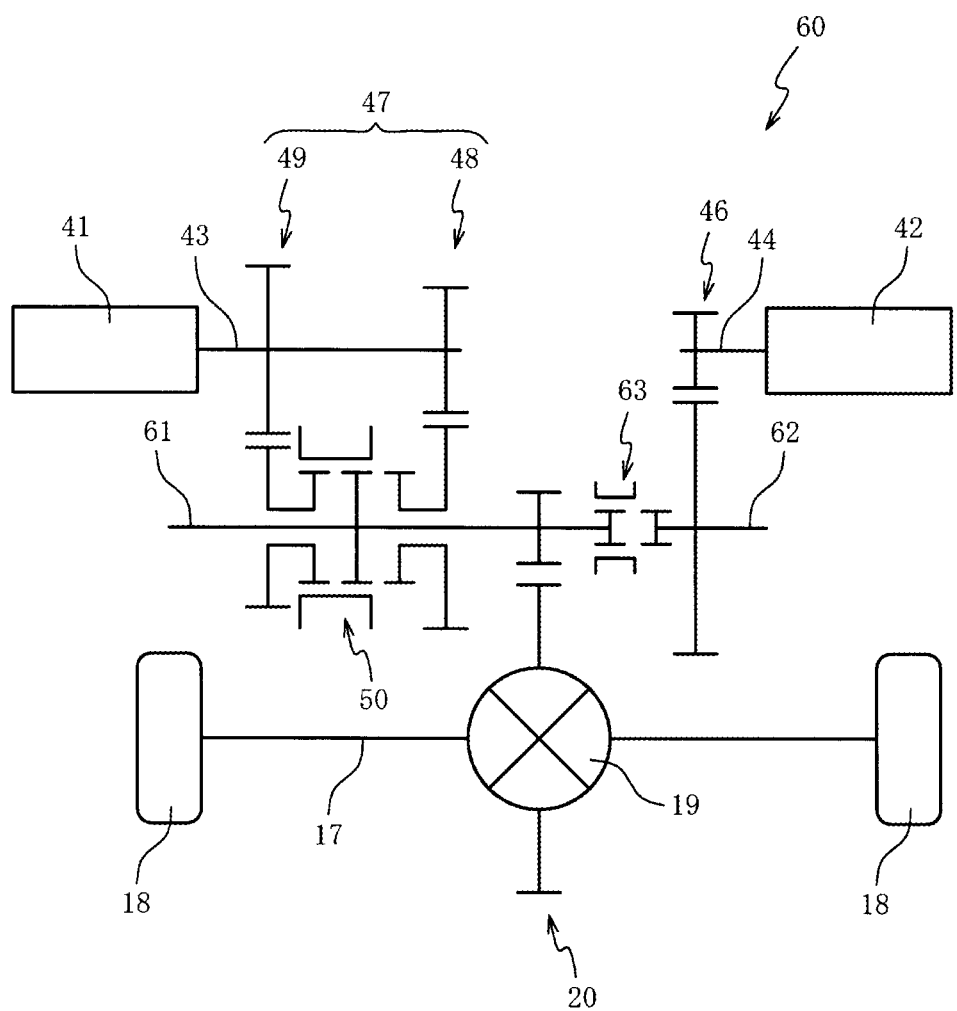
FIG. 4 Skeleton diagram of a power transmission device according to the fourth embodiment.

With reference to FIG. 4, a power transmission device 60 of the fourth embodiment will be described. In the third embodiment, the case where the torque of the second shaft 44 is transmitted directly to the output shaft 45 through the second reduction mechanism 46, has been described. On the other hand, in the fourth embodiment, the case where a first clutch 63 is interposed between the output shaft 45 and the second reduction mechanism 46 will be described. The same components as described in the first embodiment and the third embodiment are designated by the same reference characters, and the description thereof is omitted. FIG. 4 is a skeleton diagram of the power transmission device 60 according to the fourth embodiment.

The power transmission device 60 includes a first shaft 43, a second shaft 44, an output shaft 61 disposed on an axis different from that of the first shaft 43, a first reduction mechanism 47, and a second reduction mechanism 46 configured to transmit the rotation of the second shaft 44 to the output shaft 61 through a third shaft 62. The output shaft 61 is disposed in parallel to the first shaft 43. The third shaft 62 is disposed on the same axis as the output shaft 61. The power transmission device 60 is preferably mounted in construction machinery, agricultural machinery, or the like, which requires a large high-speed torque, among vehicles.

The first clutch 63 transmits or interrupts torque between the output shaft 61 and the third shaft 62. Examples of the first clutch 63 include a meshing clutch, such as a tooth clutch or a dog clutch, a friction clutch, such as a disc clutch or a cone clutch, and a one-way clutch.

A shifting operation of the power transmission device 60 will be described. In a first gear, the first motor 41 stops and the second motor 42 operates. The first clutch 63 is engaged. The torque of the second shaft 44 generated by the output of the second motor 42 is transmitted to the third shaft 62, the first clutch 63, and the output shaft 61 through the second reduction mechanism 46. When the switching device 50 is actuated to cause the second gear train 48 and the third gear train 49 to slip, the first motor 41 can be prevented from being rotated in conjunction with rotation of another member. The switching device 50 may be actuated to transmit the rotation of the output shaft 61 to the first shaft 43 through the second gear train 48 or the third gear train 49, in order to utilize the regenerative energy of the first motor 41.

In a shifting operation from the first gear to a second gear, the first motor 41 operates and the switching device 50 is actuated to transmit the torque of the first shaft 43 to the output shaft 61 through the second gear train 48, while the state of the first gear is maintained. Until the torque of the first shaft 43 is transmitted to the output shaft 61 through the second gear train 48 having been slipping in the first gear, the torque of the second shaft 44 is transmitted to the output shaft 61 through the second reduction mechanism 46. Thus, the torque of the output shaft 61 can be supplemented during the shifting operation.

In the second gear, the first motor 41 operates and the second motor 42 stops. The switching device 50 is actuated to transmit the rotation from the first shaft 43 to the output shaft 61 through the second gear train 48. When the first clutch 63 is engaged, the rotation of the output shaft 61 is transmitted to the second motor 42 through the second reduction mechanism 46. Thus, the regenerative energy of the second motor 42 can be utilized. When the first clutch 63 is disengaged, the second motor 42 is not caused to rotate in conjunction with rotation of another member.

In a shifting operation from the second gear to a third gear, the first clutch 63 is engaged and the second motor 42 operates, while the state of the second gear is maintained. While the switching device 50 is actuated and the rotation transmission path is switched from the second gear train 48 to the third gear train 49, the torque of the second shaft 44 generated by the output of the second motor 42 is transmitted to the output shaft 61 through the second reduction mechanism 46. Thus, the torque of the output shaft 61 can be supplemented during the shifting operation.

In the third gear, the first motor 41 operates and the second motor 42 stops. The rotation is transmitted from the first shaft 43 to the output shaft 61 through the third gear train 49. When the first clutch 63 is engaged, the rotation of the output shaft 61 is transmitted to the second motor 42 through the second reduction mechanism 46. Thus, the regenerative energy of the second motor 42 can be utilized. When the first clutch 63 is disengaged, the second motor 42 is not caused to rotate in conjunction with rotation of another member.

If the first motor 41 has failed, the first clutch 63 is engaged, and the switching device 50 is actuated to cause the second gear train 48 and the third gear train 49 to slip. Accordingly, the second motor 42 can be operated to drive the output shaft 61. If the second motor 42 has failed, the first clutch 63 is disengaged. Accordingly, the first motor 41 can be operated to drive the output shaft 61.

Although the present invention has been described based on the embodiments, the present invention is not limited to the above embodiments at all. It can be easily understood that various modifications may be made without departing from the gist of the present invention.

In the embodiments, the case where transmission members of the first reduction mechanism and the second reduction mechanism are gears, has been described. However, the present invention is not necessarily limited thereto. As a matter of course, another transmission member can be used for the first reduction mechanism and the second reduction mechanism. Examples of the other transmission member include a chain and a sprocket, and a belt and a pulley.

Although not described in the embodiments, as a matter of course, one or a plurality of intermediate shafts can be disposed between the first shaft 13, 43 and the output shaft 15, 45, 61, and a transmission member that configures the first reduction mechanism can be disposed on the intermediate shaft. Also, as a matter of course, one or a plurality of intermediate shafts can be disposed between the second shaft 14, 44 and the third shaft 16, 62 or between the second shaft 44 and the output shaft 45, and a transmission member that configures the second reduction mechanism can be disposed on the intermediate shaft. Moreover, as a matter of course, the first clutch can be disposed between the intermediate shaft included in the first reduction mechanism and the intermediate shaft included in the second reduction mechanism.

Although the description is omitted in the embodiments, when the power transmission device 10, 30, 40, 60 is mounted in a vehicle, the power transmission device is applicable to a four-wheel drive vehicle in which either front wheels or rear wheels are driven by two motors and the wheels not driven by the motors are driven by an engine. As a matter of course, the power transmission device is applicable to a two-wheel drive vehicle in which front wheels or rear wheels are driven by two motors or a four-wheel drive vehicle in which both front wheels and rear wheels are driven by two motors.

In the embodiments, the power transmission device 10, 30, 40, 60 having reduction mechanisms with three stages has been described. However, the present invention is not necessarily limited thereto. As a matter of course, the power transmission device can have reduction mechanisms with four or more stages. When the power transmission device has the reduction mechanisms with four or more stages, the second reduction mechanism has a power transmission path corresponding to one stage, and the first reduction mechanism has power transmission paths corresponding to three or more stages. Similarly to the embodiments, the gear ratio of the second reduction mechanism is the largest or smallest among all the gear ratios of the reduction mechanisms.

In the embodiments, the case where the switching device 25, 50 for switching a path in the first reduction mechanism 21, 47 is disposed on the output shaft 15, 45, 61, has been described. However, the present invention is not necessarily limited thereto. As a matter of course, the switching device 25, 50 can be disposed on the first shaft 13, 43. In the case where an intermediate shaft is disposed between the first shaft 13, 43 and the output shaft 15, 45, 61, and a transmission member that configures the first reduction mechanism is disposed on the intermediate shaft, the switching device 25, 50 can be disposed on the intermediate shaft, as a matter of course.

In the first embodiment, the case where the first clutch 26 is disposed between the output shaft 15 and the third shaft 16 and the second clutch 27 is disposed between the first shaft 13 and the second shaft 14, has been described. However, the present invention is not necessarily limited thereto. As a matter of course, at least one of the first clutch 26 and the second clutch 27 can be omitted.

In the third embodiment, the case where the second clutch 51 is disposed between the first shaft 43 and the second shaft 44 has been described. However, the present invention is not necessarily limited thereto. As a matter of course, the second clutch 51 can be omitted.

In the fourth embodiment, the case where the first clutch 63 is disposed between the output shaft 61 and the third shaft 62 has been described. However, the present invention is not necessarily limited thereto. As a matter of course, the first clutch 63 can be omitted, and the output shaft 61 and the third shaft 62 can be connected.

EXPLANATION OF REFERENCE

10,30,40,60: power transmission device
11,12,41,42: motor
13,43: first shaft
14,44: second shaft
15,45,61: output shaft (shaft included in the first reduction mechanism)
16,62: third shaft (shaft included in the second reduction mechanism)
21,47: first reduction mechanism
24,32,46: second reduction mechanism
26,33,63: first clutch
27,51: second clutch
31: second shaft (shaft included in the second reduction mechanism)

The invention claimed is:

1. A power transmission device comprising:
a first shaft and a second shaft to which powers of two motors are respectively inputted;
an output shaft disposed on an axis different from that of the first shaft;
a first reduction mechanism configured to transmit rotation of the first shaft to the output shaft through a plurality of paths; and
a second reduction mechanism that has only one path to transmit rotation of the second shaft to the output shaft, wherein
in the first reduction mechanism, the plurality of paths have different gear ratios, and
a gear ratio of the second reduction mechanism is smallest or largest among all gear ratios of the reduction mechanisms,
wherein the power transmission device further comprises:
a shaft that is other than the first shaft and is included in the first reduction mechanism;
an additional shaft that is disposed on the same axis as the shaft and is included in the second reduction mechanism; and
a first clutch configured to transmit or interrupt torque between the shaft and the additional shaft.

2. The power transmission device according to claim 1, wherein
the first shaft and the second shaft are disposed on the same axis, and
the power transmission device comprises a second clutch configured to transmit or interrupt torque between the first shaft and the second shaft.

3. The power transmission device according to claim 1, wherein the gear ratio of the second reduction mechanism is the smallest among all gear ratios of the reduction mechanisms.

* * * * *